US008199716B2

(12) United States Patent
Grilli et al.

(10) Patent No.: US 8,199,716 B2
(45) Date of Patent: *Jun. 12, 2012

(54) METHOD AND SYSTEM FOR PERFORMING HANDOFF IN WIRELESS COMMUNICATION SYSTEMS

(75) Inventors: Francesco Grilli, Irvine, CA (US); Serge Willenegger, Onnens (CH); Edward G. Tiedemann, Jr., Concord, MA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/556,169

(22) Filed: Nov. 3, 2006

(65) Prior Publication Data
US 2007/0064640 A1    Mar. 22, 2007

Related U.S. Application Data

(63) Continuation of application No. 09/930,763, filed on Aug. 15, 2001, which is a continuation-in-part of application No. 09/372,261, filed on Aug. 11, 1999, now Pat. No. 6,587,446.

(51) Int. Cl.
*H04W 4/00* (2009.01)
(52) U.S. Cl. .......................... 370/331; 370/332; 455/336
(58) Field of Classification Search .................. None
See application file for complete search history.

(56) References Cited

U.S. PATENT DOCUMENTS

| | | | |
|---|---|---|---|
| 4,901,307 A | 2/1990 | Gilhousen et al. | |
| 5,101,501 A | 3/1992 | Gilhousen et al. | |
| 5,103,459 A | 4/1992 | Gilhousen et al. | |
| 5,109,390 A | 4/1992 | Gilhousen et al. | |
| 5,182,753 A | 1/1993 | Dahlin et al. | |
| 5,267,261 A | 11/1993 | Blakeney, II et al. | |
| 5,414,796 A | 5/1995 | Jacobs et al. | |
| 5,418,839 A | 5/1995 | Knuth et al. | |
| 5,450,621 A | 9/1995 | Kianush et al. | |
| 5,457,816 A * | 10/1995 | Koyama ..................... | 455/161.2 |
| 5,471,503 A | 11/1995 | Altmaier et al. | |
| 5,490,165 A | 2/1996 | Blakeney, II et al. | |
| 5,546,464 A | 8/1996 | Raith et al. | |

(Continued)

FOREIGN PATENT DOCUMENTS

EP            0548939         12/1992

(Continued)

OTHER PUBLICATIONS

International Search Report, PCT/US1999/003088—International Search Authority—European Patent Office—Jul. 9, 1999.
3GPP Specification detail; "General Packet Radio Service (GPRS); Mobile Station (MS)-Base Station System (BSS) interface; Radio Link Control/Medium Access Control (RLC/MAC) protocol;" Mar. 20, 1998.
ETSI, "Digital Cellular Telecommunications System; (Phase 2+);General Packet Radio Service (GPRS); Mobile Station (MS)-Base Station System (BSS) Interface; Radio Link Control/Medium Access Control (RLC/MAC) protocol (GSM 04.60 ver, 6.0.0)", ETSI Draft EN, Mar. 1998.

(Continued)

*Primary Examiner* — Phirin Sam
(74) *Attorney, Agent, or Firm* — Phillip R Wadsworth; Abdollah Kalbab

(57) ABSTRACT

The structure of a time-multiplexed physical channel is used to time inter-frequency or inter-system search excursions. A mobile station that receives an instruction to perform a search excursion prepares for the search excursion by detecting the first radio frame of a message frame. Transport format combination indicator bits are extracted from the first radio frame and stored. After the search excursion is performed, the mobile station recalls the stored indicator bits and uses the indicator bits to decode other radio frames of the message frame.

30 Claims, 12 Drawing Sheets

U.S. PATENT DOCUMENTS

| | | | |
|---|---|---|---|
| 5,594,718 | A | 1/1997 | Weaver, Jr. et al. |
| 5,625,876 | A * | 4/1997 | Gilhousen et al. |
| 5,697,055 | A | 12/1997 | Gilhousen et al. |
| 5,701,294 | A | 12/1997 | Ward et al. |
| 5,706,315 | A | 1/1998 | Ogoro |
| 5,727,033 | A | 3/1998 | Weaver et al. |
| 5,751,725 | A | 5/1998 | Chen |
| 5,848,063 | A | 12/1998 | Weaver, Jr. et al. |
| 5,896,368 | A | 4/1999 | Dahlman et al. |
| 5,920,554 | A | 7/1999 | Nakamura et al. |
| 5,930,706 | A | 7/1999 | Raith |
| 5,936,961 | A * | 8/1999 | Chiodini et al. ............. 370/441 |
| 5,937,019 | A | 8/1999 | Padovani |
| 5,946,605 | A * | 8/1999 | Takahisa et al. ............... 455/68 |
| 5,953,324 | A * | 9/1999 | Adachi ........................ 370/331 |
| 5,953,325 | A | 9/1999 | Willars |
| 5,963,870 | A | 10/1999 | Chheda et al. |
| 5,982,760 | A | 11/1999 | Chen |
| 5,995,836 | A | 11/1999 | Wijk et al. |
| 5,999,816 | A | 12/1999 | Tiedemann, Jr. et al. |
| 6,047,165 | A | 4/2000 | Wright et al. |
| 6,073,021 | A | 6/2000 | Kumar et al. |
| 6,073,025 | A | 6/2000 | Chheda et al. |
| 6,075,974 | A | 6/2000 | Saints et al. |
| 6,075,989 | A * | 6/2000 | Moore et al. .................. 455/436 |
| 6,078,570 | A | 6/2000 | Czaja et al. |
| 6,101,175 | A | 8/2000 | Schorman et al. |
| 6,118,498 | A * | 9/2000 | Reitmeier ..................... 348/725 |
| 6,125,267 | A * | 9/2000 | Monge-Navarro et al. ........................ 455/161.1 |
| 6,128,493 | A | 10/2000 | Song |
| 6,134,440 | A | 10/2000 | Black |
| 6,144,649 | A | 11/2000 | Storm et al. |
| 6,147,983 | A | 11/2000 | Backstrom |
| 6,151,502 | A | 11/2000 | Padovani et al. |
| 6,154,659 | A | 11/2000 | Jalali et al. |
| 6,157,835 | A | 12/2000 | Findikli et al. |
| 6,181,943 | B1 | 1/2001 | Kuo et al. |
| 6,185,431 | B1 | 2/2001 | Li et al. |
| 6,188,900 | B1 | 2/2001 | Ruiz et al. |
| 6,212,368 | B1 | 4/2001 | Ramesh et al. |
| 6,252,861 | B1 | 6/2001 | Bernstein et al. |
| 6,304,755 | B1 | 10/2001 | Tiedemann, Jr. et al. |
| 6,310,869 | B1 | 10/2001 | Holtzman et al. |
| 6,370,367 | B1 * | 4/2002 | Monge-Navarro et al. ........................ 455/226.1 |
| 6,385,437 | B1 | 5/2002 | Park et al. |
| 6,385,455 | B1 * | 5/2002 | St. Clair et al. ............... 455/450 |
| 6,396,804 | B2 | 5/2002 | Odenwalder |
| 6,396,820 | B1 | 5/2002 | Dolan et al. |
| 6,535,563 | B2 | 3/2003 | Tiedemann, Jr. et al. |
| 6,553,064 | B1 * | 4/2003 | Chen et al. ..................... 375/224 |
| 6,563,807 | B1 * | 5/2003 | Kim et al. ..................... 370/331 |
| 6,587,446 | B2 * | 7/2003 | Sarkar et al. ................. 370/331 |
| 6,597,922 | B1 * | 7/2003 | Ling et al. .................... 455/522 |
| 6,603,751 | B1 * | 8/2003 | Odenwalder ................. 370/331 |
| 6,611,506 | B1 | 8/2003 | Huang et al. |
| 6,665,308 | B1 * | 12/2003 | Rakib et al. ................... 370/441 |
| 6,701,130 | B1 | 3/2004 | Hamalaine et al. |
| 6,788,748 | B2 | 9/2004 | Chen et al. |
| 6,865,173 | B1 | 3/2005 | Czaja et al. |
| 6,879,576 | B1 | 4/2005 | Agrawal et al. |
| 7,190,688 | B1 * | 3/2007 | Kamel et al. .................. 370/342 |
| 7,242,935 | B2 * | 7/2007 | Odenwalder ................. 455/436 |
| 7,245,597 | B2 * | 7/2007 | Grilli et al. .................... 370/331 |
| 7,603,123 | B2 | 10/2009 | Odenwalder |
| 2002/0082019 | A1 | 6/2002 | Suney et al. |

FOREIGN PATENT DOCUMENTS

| | | |
|---|---|---|
| EP | 0530165 | 3/1993 |
| EP | 0566551 | 10/1993 |
| EP | 0667726 | 2/1995 |
| EP | 0748140 | 12/1996 |
| EP | 0773695 | 5/1997 |
| EP | 0809365 | 11/1997 |
| EP | 0977393 A1 | 2/2000 |
| EP | 1509057 | 2/2005 |
| EP | 1509058 | 2/2005 |
| EP | 1076956 | 5/2006 |
| GB | 2314734 | 1/1998 |
| JP | 06252819 A | 9/1994 |
| JP | 08500475 | 1/1996 |
| JP | 8009457 A | 8/1996 |
| JP | 8237220 A | 9/1996 |
| JP | 09018927 | 1/1997 |
| JP | 09-083429 | 3/1997 |
| JP | 964814 | 3/1997 |
| JP | 09083429 | 3/1997 |
| JP | 9307942 | 11/1997 |
| JP | 10051834 | 2/1998 |
| RU | 2127963 C1 | 3/1999 |
| WO | 9429981 | 12/1994 |
| WO | 95008237 | 3/1995 |
| WO | 9616524 | 5/1996 |
| WO | 9626616 | 8/1996 |
| WO | WO9623369 A1 | 8/1996 |
| WO | WO9638999 A1 | 12/1996 |
| WO | WO9702668 A1 | 1/1997 |
| WO | 97040792 | 6/1997 |
| WO | 97029611 | 8/1997 |
| WO | 9740593 | 10/1997 |
| WO | 97040592 | 10/1997 |
| WO | WO9719491 A2 | 5/1998 |
| WO | WO9836507 A1 | 8/1998 |
| WO | WO9847253 A1 | 10/1998 |
| WO | 9938347 | 7/1999 |
| WO | 98036607 | 8/1999 |
| WO | 99041934 | 8/1999 |
| WO | 99057849 | 11/1999 |
| WO | WO9957649 A2 | 11/1999 |

OTHER PUBLICATIONS

ETSI, "Digital Cellular Telecommunications System; (Phase 2+);Technical Realization of the Short Message Service (SMS), Point-to-Point (PP) (GSM 03.40 version 5.6.0)", ETSI Technical Report Draft, ETS 300 901, 3rd Ed., Aug. 1997, pp. 1, 13-14.

ETSI, "Digital Cellular Telecommunications System; Multiband Operation of GSM/DC 1 800 by a Singel Operator (GSM 03.26 version 5.2.0)". ETSI Technical Report 366, 3rd Ed., Nov. 1997, pp. 1-17.

TIA/EIA Interim Standard IS-95-A "Mobile Station-Base Station Compatibility Standard for Dual-Mode Wideband Spread Spectrum Cellular System", Jul. 1993.

Andermo. Pg , Editor; "CODIT Final Review Report;" Nov. 21, 1995; pp. 1-7, 10-12, 21-25, 46-49, & 76-87: Issue 2.0.

Baier et al., Design Study for a CDMA-Based Third-Generation Mobile Radio System , IEEE Journal on Selected Areas in Commiunications. May 1994, pp. 733-743, vol. 12, No. 4 IEEE.

Gustafsson et al., "Compressed Mode Techniques for Inter-Frequency Measurements in a Wide-band DSCDMA System". Waves of the Year 2000+ PIMRC. The IEEE International Symposium on Personal, Indoor and Mobile Radio Communications., 1997, pp. 231-235, IEEE.

Ojanpera et al., text book "Wideband CDMA for Third Generation Mobile Communications" 1998, pp. 152-155, 178-179, 183, 226-231, and 337.

Satarasinghe, et al. "A Novel Method for CDMA Hard Handoff" Communications: The Key to Global Prosperity. Globecom, IEEE pp. 1766-1768 (1996).

International Search Report, PCT/US2000/022244—International Search Authority—European Patent Office—Nov. 12, 2000.

European Search Report—EP07015116, Search Authority Munich, Sep. 11, 2007.

European Search Report—EP07016648, Search Authority Munich, Oct. 4, 2007.

European Search Report—EP05007867, Search Authority Munich Jun. 3, 2005.

* cited by examiner

INTER-FREQUENCY SEARCH EXCURSION TIMING

FORWARD LINK POWER CONTROL INCREASE DURING SEARCH EXCURSION

REVERSE LINK POWER INCREASE DURING SEARCH VISIT

METHOD AND SYSTEM FOR PERFORMING HANDOFF IN WIRELESS COMMUNICATION SYSTEMS

CLAIM OF PRIORITY UNDER 35 U.S.C. §120

This application is a continuation application of co-pending U.S. patent application Ser. No. 09/930,763 filed Aug. 15, 2001 which is a Continuation in part of U.S. patent Ser. No. 09/372,261, entitled "METHOD AND SYSTEM FOR PERFORMING A HANDOFF IN A WIRELESS COMMUNICATION SYSTEM, SUCH AS A HARD HANDOFF" filed Aug. 11, 1999 now U.S. Pat. No. 6,587,446 assigned to the assignee hereof and hereby expressly incorporated by reference herein.

FIELD OF INVENTION

The invention relates to wireless communication systems, and, more particularly, to methods and apparatus for providing hard handoffs between cells in such systems.

BACKGROUND

In a code division multiple access (CDMA) system, the vast majority of handoffs happen between cells on the same CDMA channel and use soft handoff procedures. On some occasions, the mobile stations need to perform a handoff between cells on different CDMA channels where such channels are at different radio frequencies (RF), often denoted as inter-frequency hard handoff. On some other occasions, the mobile stations need to perform a handoff from CDMA cells to cells that use a different Radio Access Technology (RAT), often denoted as inter-system or inter-RAT handoff, e.g. a CDMA to analog handover or a handoff between Wideband-CDMA (WCDMA) and Global System for Mobile Communications (GSM). Such situations are typically, but not limited to, either a handoff between different operators, a handoff between different RF channels allocated for capacity reasons, or a handoff between different signal modulation technologies.

Before effecting an inter-frequency or inter-system hard handoff, the mobile station is directed by the base station to tune to the new target frequency, measure the radio environment (e.g., pilot signal strength of the received signals, or RXLEV, RSSI and BSIC for GSM systems, etc.), and report the measurement back to the base station. Such a procedure is specified in TIA/EIA-95-B and in 3GPP TS 25.331v4.1.0 and greatly enhances the probability of success of an inter-frequency or inter-system handoff.

An essential requirement of the measurement on the target frequency often referred to as "search excursion," is to minimize the disruption of the current service on the originating frequency. The target frequency can be located on the same RAT as the originating frequency, or the target frequency can be located on a different RAT from the originating frequency. Handoffs to a second frequency in the same system or to a frequency in a different system could result in poor signal performance without adequate prior sampling. On the other hand, sampling for long periods of time may cause the signal at the originating frequency to be lost completely. The method described below permits the mobile station to minimize the search time and to limit the disruption of service.

SUMMARY

Search excursions during a message frame can cause the lost of valuable transmission format information, which is used by the receiver to decode data in the message frame. The lost of such transmission format information forces the receiver to make random guesses as to the format of the data portions of the message frame. Methods and apparatus are presented herein to prevent the loss of data by timing search excursions. In one aspect, a method is presented for timing a search excursion, comprising: detect a first radio frame of a Transmission Time Interval (TTI) on an original frequency; extracting a plurality of indicator bits from the first radio fame; storing the plurality of indicator bits; performing the search excursion on a target frequency, wherein the search excursion ends with a return to the original frequency; and decoding a subsequent radio frame of the TTI using the stored plurality of indicator bits from the first radio frame. In another aspect, the timing of the search excursion is combined with power control techniques.

In another aspect, an apparatus is presented for performing a timed search excursion, comprising: at least one memory element and a processor configured to execute a set of instructions stored on the at least one memory element, the set of instructions for: decoding at least one radio frame in a Transmission Time Interval (TTI) on the original frequency; extracting a parameter value from the at least one radio frame and storing the parameter value in the at least one memory element; controlling a search excursion to a target frequency after storing the parameter value, wherein the search excursion ends with a return to the original frequency; and decoding a subsequently received radio frame by using the stored parameter value.

BRIEF DESCRIPTION OF THE DRAWINGS

In the figures, like reference numbers identify similar elements. For case in identifying the discussion of any particular element, the most significant digit in a reference number refers to the figure number in which that element is first introduced (e.g., element 204 is first introduced and discussed with respect to FIG. 2).

DETAILED DESCRIPTION

A wireless communication system, and in particular, a method and apparatus for minimizing search excursion time to a target frequency and disruption of current service on an originating frequency is described in detail herein. In the following description, numerous specific details are provided to give a thorough understanding of the invention. One skilled in the relevant technology, however, will readily recognize that the invention can be practiced without these specific details or with alternative elements or steps. In other instances, well-known structures and methods are not shown in detail to avoid obscuring the invention.

Figure 1:
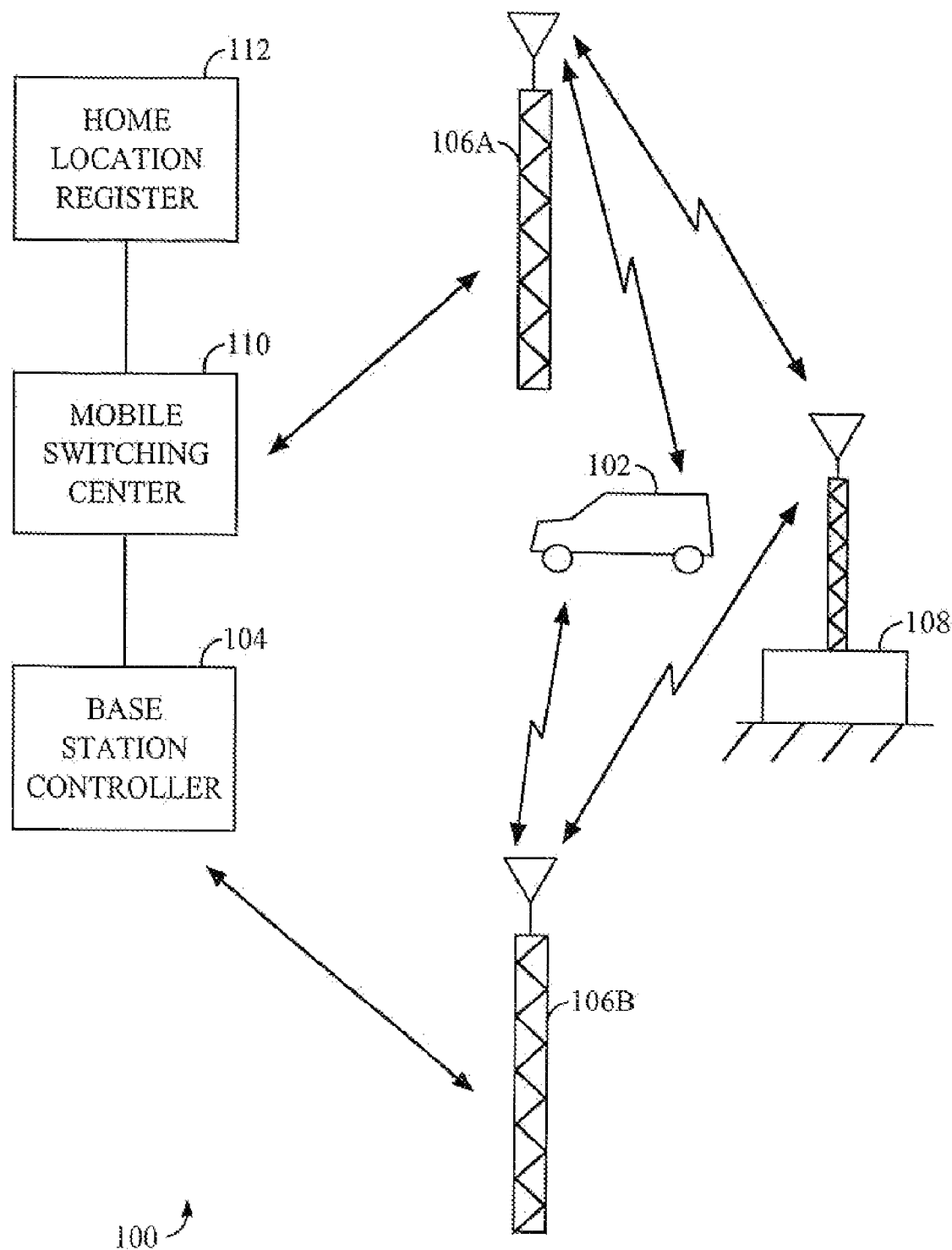
FIG. 1 illustrates a typical wireless communication system that can employ the invention.

FIG. 1 illustrates a cellular subscriber communication system 100 that uses multiple access techniques, such as code division multiple access (CDMA) for communicating between users of user stations (e.g., mobile telephones) and cell sites or base stations. In FIG. 1, a mobile user station 102 communicates with a base station controller 104 by means of one or more base stations 106a, 106b, etc. Similarly, a fixed user station 108 communicates with the base station controller 104, but by means of only one or more predetermined and proximate base stations, such as the base stations 106a and 106b.

The base station controller 104 is coupled to and typically includes interface and processing circuitry for providing system control to the base stations 106a and 106b. The base station controller 104 may also be coupled to and communicate with other base stations, and possibly even other base station controllers. The base station controller 104 is coupled to a mobile switching center 110 that in turn is coupled to a home location register 112. During registration of each user station at the beginning of each call, the base station controller 104 and the mobile switching center 110 compare registration signals received from the user stations to data contained in the home location register 112, as is known in the art. Handoffs may occur between the base station controller 104 and other base controllers, and even between the mobile switching center 110 and other mobile switching centers, as is known by those skilled in this technology.

When the system 100 processes voice or data traffic calls, the base station controller 104 establishes, maintains, and terminates the wireless link with the mobile station 102 and the fixed station 108, while the mobile switching center 110 establishes, maintains, and terminates communications with a public switched telephone network (PSTN). While the discussion below focuses on signals transmitted between the base station 106a and the mobile station 102, those skilled in this technology will recognize that the discussion equally applies to other base stations and to the fixed station 108. The terms "cell" and "base station" are generally used interchangeably herein.

Figure 2:
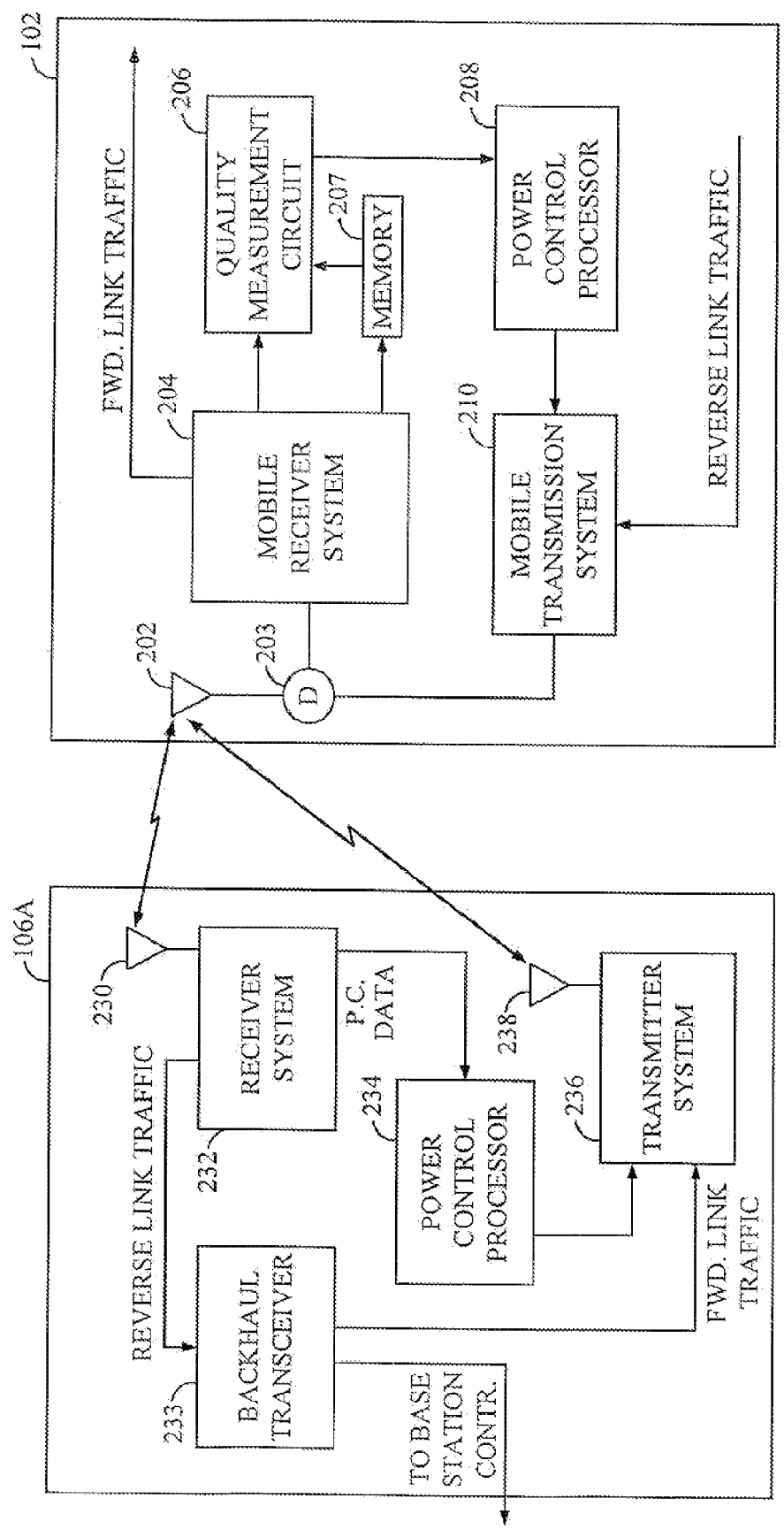
FIG. 2 is a block diagram of typical components found in the wireless communication system of FIG. 1 that can employ the invention.

Referring to FIG. 2, the mobile station 10 includes an antenna 202 that transmits signals to, and receives signals from the base station 106a. A duplexer 203 provides a forward link channel or signal from the base station 106a tot a mobile receiver system 204. The receiver system 204 downconverts, demodulates, and decodes the received signal. The receiver system 204 then provides a predetermined parameter or set of parameters to a quality measurement circuit 206. Examples of parameters might include measured signal to noise ratio (SNR) measured received power, or decoder parameters such as symbol error rate, Yamamoto metric, or parity bit check indication. A memory buffer 207 can be included for use with the invention described herein. Additional details regarding operation of the mobile station 102 (and the base station 106a) are found, for example, in U.S. Pat. No. 5,751,725 entitled "METHOD AND APPARATUS FOR DETERMINING THE RATE OF RECEIVED DATA IN A VARIABLE RATE COMMUNICATION SYSTEM," assigned to the assignee of the present invention, and incorporated by reference herein.

The quality measurement circuit 206 receives the parameters from the receiver system 204 and determines a quality measurement signal or power level of the received signal. The quality measurement circuit 206 can generate energy per bit ($E_{.b}$) or energy per symbol ($E_{.s}$) measurements from portions or windows of each frame. Preferably, the energy per bit or energy per symbol measurements are normalized (e.g., $E_{.b}/N_{.o}$), or normalized and include interference factors (e.g., $E_{.b}/N_{.t}$), as is known in the art. Based on these measurements, the quality measurement circuit 206 produces a power level signal, A power control processor 208 receives the power level signal from the quality measurement circuit 206, compares the signal to a threshold, and produces a power control message based on the comparison. Each power control message can indicate a change in power for the forward link signal. Alternatively, power control processor 208 produces power control messages representing the absolute power of the received forward link signal, as is known in the art. The power control processor 208 produces preferably several (e.g., sixteen) power control messages in response to several power level signals per frame. While the quality measurement circuit 206 and power control processor 208 are generally described herein as separate components, such components can be monolithically integrated, or the operations performed by such components can be performed by a single microprocessor.

A mobile transmission system 210 encodes, modulates, amplifies, and up converts the power control messages, via the duplexer 203 and the antenna 202. In the illustrated embodiment, the mobile transmission system 210 provides the power control message in a predetermined location of an outgoing reverse link flame.

The mobile transmission system 210 also receives reverse link traffic data, such as voice or general computer data, from the user of the mobile station. The mobile transmission, system 210 requests a particular service (including power/rate) from the base station 106 based on the traffic data to be transmitted. In particular, the mobile transmission system 210 requests bandwidth allocation appropriate for the particular service. The base station 106a then schedules or allocates bandwidth (power/rate) resources based on requests from the mobile station 102 and other users to optimize such resource allocation, given power constraints of the system. Thus, effectively managing transmission power in the system will permit more effective bandwidth use.

The base station 106a includes a receiving antenna 230 that receives the reverse link frames from the mobile station 102. A receiver system 232 of the base station 106a down converts, amplifies, demodulates, and decodes the reverse link traffic. A backhaul transceiver 233 receives and forwards to the base station controller 104 reverse link traffic. The receiver system 232 also separates the power control messages from each reverse link traffic frame and provides the power control messages to a power control processor 234.

The power control processor 234 monitors the power control messages and produces a forward link transmitter power signal to a forward link transmitter system 236. The forward link transmitter system 236, in response thereto, either increases, maintains, or decreases the power of the forward link signal. The forward link signal is then transmitted via a transmitting antenna 238. Additionally the power control processor 234 analyzes the quality of the reverse link signal from the mobile station 102 and provides appropriate feedback control messages the forward link transmitter system 236. The forward link transmitter system 236, in response thereto, transmits the feedback control messages via the transmitting antenna 238 over the forward link channel to the mobile station 102. The transmitter system 236 also receives forward link traffic data from the base station controller 104 via the backhaul transceiver 233. The forward link transmitter system 236 encodes, modulates, and transmits via the antenna 238 the forward link traffic data Unless described otherwise herein, the construction and operation of the various blocks and elements shown in FIGS. 1 and 2 and the other figures are of conventional design and operation. Thus, such blocks or elements need not be described in further detail because they will be understood by those skilled in the relevant art. Any additional description is omitted for brevity and to avoid obscuring the detailed description of the invention. Any modifications necessary to the blocks of the communication system 100 of FIGS. 1 and 2, or the other systems shown therein can be readily made by one skilled in the relevant art based on the detailed description provided herein.

The closed-loop power control system for user stations, including the mobile station 102 and base station 106a, dynamically adjusts the transmit power for each user based on the user's propagation conditions to yield the same frame error rate (FER) or each user for voice services (e.g., a 1% FER). As noted above, many users, however, may request transmission for data services in lieu of voice services, such as facsimile, e-mail and general computer data, all of which are insensitive to delay but require a lower FER (or lower bit error rate (BER)). A user may even require video services, which not only require a lower FER but are sensitive to delay. The base station 106a dynamically assigns transmission rates based on requests from each user under known techniques.

Under one CDMA standard, described in the Telecommunications Industry Association's TIA/EIA-95-A Mobile Stations-Base Station Compatibility Standard For Dual-Mode Wideband Spread Spectrum Cellular System, each base station transits pilot, sync, paging, and, forward traffic channels to its users. The pilot channel is an unmodulated, direct-sequence spread spectrum signal transmitted continuously by each base station. The pilot channel enables each user to acquire the timing of the channels transmitted by the base station, and it provides a phase reference for coherent demodulation. The pilot channel also provides a means for signal strength comparisons between base stations to determine when to hand off between base stations (such as when moving between cells). Recent CDMA modulation techniques have been proposed using dedicated time multiplexed ("DTMP") pilot symbols. Under the DTMP approach, separate pilot symbols, are time multiplexed on each user's traffic channel. Each user sequentially de-spreads the pilot symbols (and information symbols). There is also an alternative common code multiplexed pilot ("CCMP") approach, where one common channel is dedicated to broadcasting a pilot signal. No pilot symbols are multiplexed with dedicated channels, and all users de-spread both the pilot symbols and the modulated information signals in parallel. Such systems are described in more detail in U.S. patent application Ser. No. 09/144,402, flied Aug. 31, 1998, entitled METHOD AND APPARATUS FOR REDUCING AMPLITUDE VARIATIONS AND INTERFERENCE IN COMMUNICATION SIGNALS, SUCH AS WIRELESS COMMUNICATION SIGNALS EMPLOYING INSERTED PILOT SYMBOLS, assigned to the same assignee of this invention.

Inter-Frequency or Inter-System Search

Figure 3:
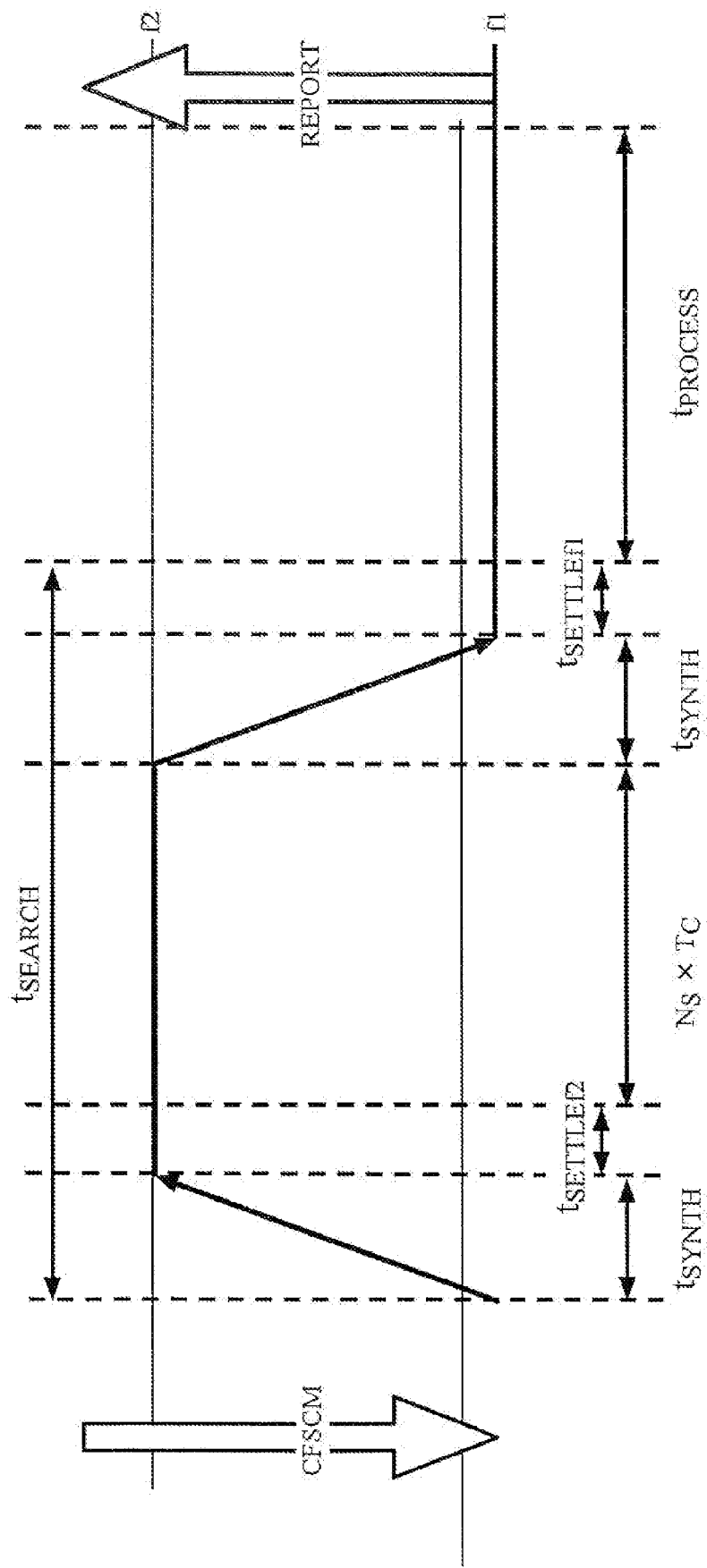
FIG. 3 is a timing diagram of an inter-frequency or inter-system search excursion.

Referring next to FIG. 3, shown therein is a diagram of the different timing involved in performing a search excursion. While FIG. 3 would be self-explanatory to one of ordinary skill in the relevant art, a brief explanation is provided. The reference $t_{search}$ corresponds to the time required to collect the N samples on frequency f2. The total time will be $t_{search}$ plus the time it takes to process the samples alter returning to the original frequency f1. The times $t_{synth}$, and $t_{settle}$ correspond to the time required to switch and settle at a new frequency, respectively. The time period of $N_s \times T_{sub.c}$ represents the sampling time for $N_s$ samples, and $t_{process}$ represents the time to process the samples.

A method for minimizing the search time to another frequency can be described as follows:

First, the mobile station is currently demodulating an original or first frequency f1. An inter-frequency or inter-system hard handoff to a target frequency f2 might be required, such as hen certain signal quality measurements (e.g., those noted above) fall below predetermined thresholds. When reporting such dropping quality to the base station 106a, the mobile, station 102 is directed by the base station (e.g., via a Candidate Frequency Search Request/Control Message ("CF-SCM")) to perform a search excursion to a target frequency f2.

The mobile station tunes to frequency f2 and collects N chin samples (a chip being one bit of pseudonoise at, for example, 1024 bps for orthogonally encoded symbols). The samples are stored in a memory buffer; the mobile station does not perform pilot searches and pilot strength measurements while on frequency f2. The mobile station tunes back to the original frequency f1, resumes reception of forward link and transmission of reverse link, and processes the N samples collected on frequency f2 simultaneously.

The mobile station processes the samples collected on frequency f2 using a searcher that processes the stored samples while simultaneously processing the signal received on the original frequency f1. The mobile station reports to the base station the corresponding pilot strength measurements from frequency f2. One of skill in this technology will recognize the searcher referred to above and would have the requisite skill to provide or obtain the same.

Figure 4:
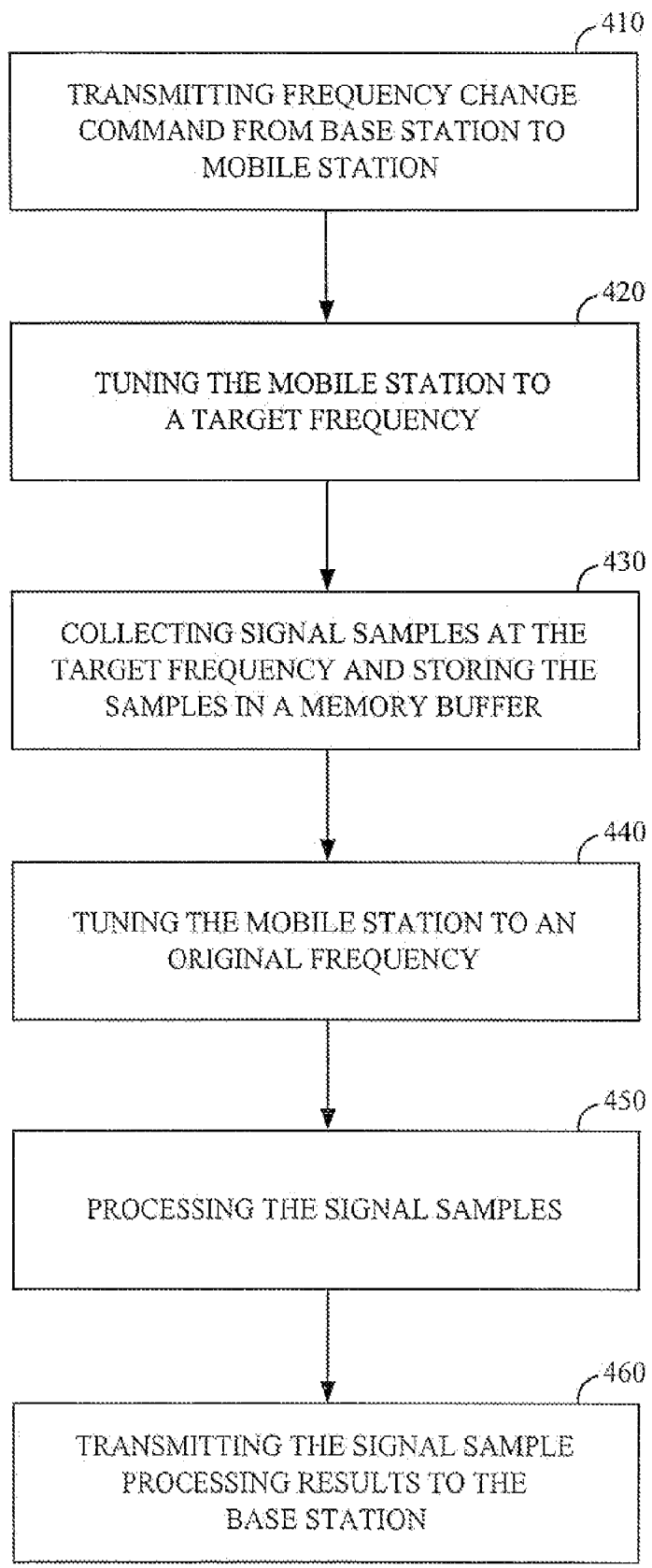
FIG. 4 is a flowchart of a method for performing a frequency search excursion under an embodiment of the invention.

The foregoing method is illustrated in FIG. 4 as a routine 400 that begins in step 410 where the base station 106a transmits a frequency change command to the mobile station 102 under a Candidate Frequency Search Request Control Message as defined by TIA/EIA-95-B Standard incorporated by reference. In response to this command, the mobile station 102 tunes to the target frequency f2 under step 420.

In step 430, the mobile station 102 collects signal samples at the target frequency f2 and locally stores the samples in the memory buffer 207. Under step 440, the mobile station 102 tunes back to the first frequency f1 and processes the signal samples stored in the memory buffer 207 under step 450. Note, steps 440 and 450 can be performed concurrently.

After the signal samples are processed as described above, the mobile station 102 under step 460 transmits the signal sample processing results to the base station 106a.

Minimizing Impact of Search Excursion on Current Frame

When the mobile station tunes to another frequency f2 to perform an inter-frequency or inter-system search, forward link symbols transmitted by the base station during the $t_{search}$ period cannot be received by the mobile station. Similarly, the mobile station does not transmit during $t_{search}$ and the base station loses reverse link symbols during the $t_{search}$ time period. To minimize the impact of this loss on both the current forward and reverse link frames, the mobile and base stations increase the amount of power allocated to the other symbols of the forward-error-correction-encoded and interleaved frame of symbols impacted by the search excursion. For the frame to be demodulated correctly, the additional amount of power required for symbols not impacted by the search excursion is a function of the search excursion time t.sub.search, as noted herein.

Forward Link Power Control During Search Visit

To overcome the loss of forward link symbols during the t.sub.search time period, the mobile station increases the target $E_b/N_o$ of the forward link closed-loop fast power control by .DELTA..sub.target dB.

This new target $E_b/N_o$ is set K power control groups (PCG) before the search excursion. The required number K of previous PCGs affected before the search excursion and the required increase in target $E_b/N_o$ (.DELTA..sub.target) depends on the duration of the search excursion t.sub.search; the longer t.sub.search is, the larger K. As a result of the increase in the target $E_b/N_o$, the forward link power will ramp-up prior to the inter-frequency or inter-system search.

Figure 5:
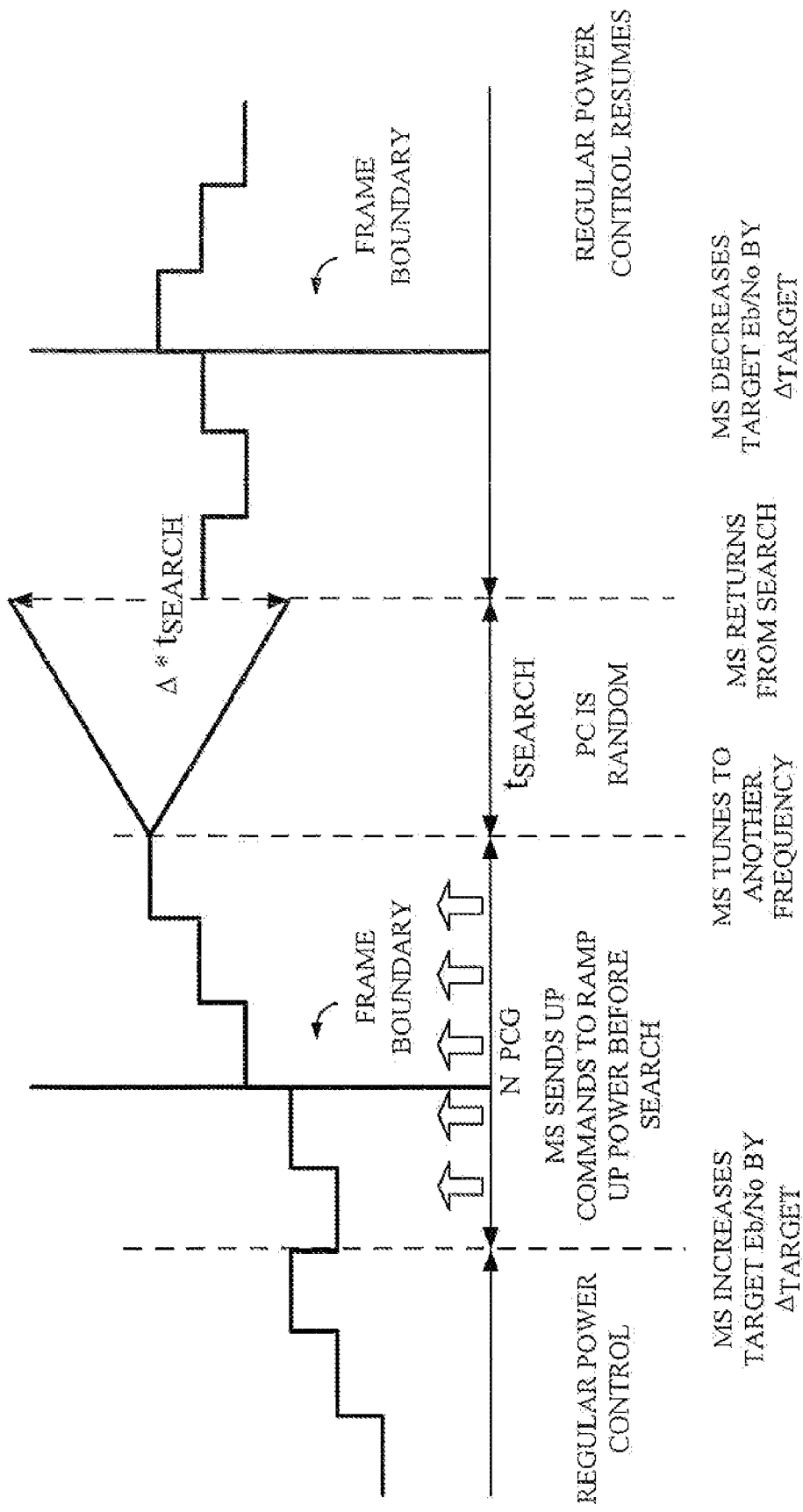
FIG. 5 is a graph of power verses the that illustrates the succession of forward link power levels related to inter-frequency or inter-system search excursions.

FIG. 5 illustrates the succession of forward link power levels related to an inter-frequency or intersystem search excursion. Although FIG. 5 is self-explanatory to one of ordinary skill in the relevant art, a brief explanation is provided. After the search excursion, the mobile station 102 resumes demodulation of the forward link symbols of the current frame. At this stage the mobile station 102 knows the total symbol energy received in the current frame and can compare this to the required energy per frame to achieve the target frame error rate. The mobile station 102 can use this metric to increase or decrease the target $E_b/N_o$ for the remaining power control groups of the frame. If the search excursion expands over a frame boundary, the mobile station 102 may increase its target $E_b/N_o$ during the next frame to make up for the lost symbols in the first part of the frame. Details regarding closed loop power control can be found for example, in U.S. patent application Ser. Nos. 08/752,860 and 08/879,274, entitled METHOD AND APPARATUS FOR ADJUSTING THRESHOLDS AND MEASUREMENTS OF RECEIVED SIGNALS BY ANTICIPATING POWER CONTROL COMMANDS YET TO BE EXECUTED and METHOD AND APPARATUS FOR POWER ADAPTATION CONTROL AND CLOSED-LOOP COMMUNICATIONS filed Nov. 20, 1996 and Jun. 20, 1997, all respectively and assigned to the assignee of this inventions Reverse Link Power Control During Search Visit While searching on the target frequency f2, the base station 106a will lose communication with the mobile station 102 and will not receive symbols during the t.sub.search time period. To overcome the loss of those symbols, the mobile station 102 can increase the total transmission power on the reverse link by a quantity .DELTA..sub.search dB. The quantity .DELTA..sub.search depends on the duration of the search t.sub.search and corresponds to the additional required symbol energy over the remainder of the frame to overcome the loss of symbols during t.sub.search and still permit the base station 106a to demodulate the frame correctly. The base station 106a can inform the mobile station 102 of the maximum tolerable increase .DELTA..sub.search dB in the message directing the mobile station to perform an inter-frequency or inter-system search (e.g., in the ("FCSM")). This value can depend on the maximum tolerable interference currently determined by the base station 106a.

Figure 6:
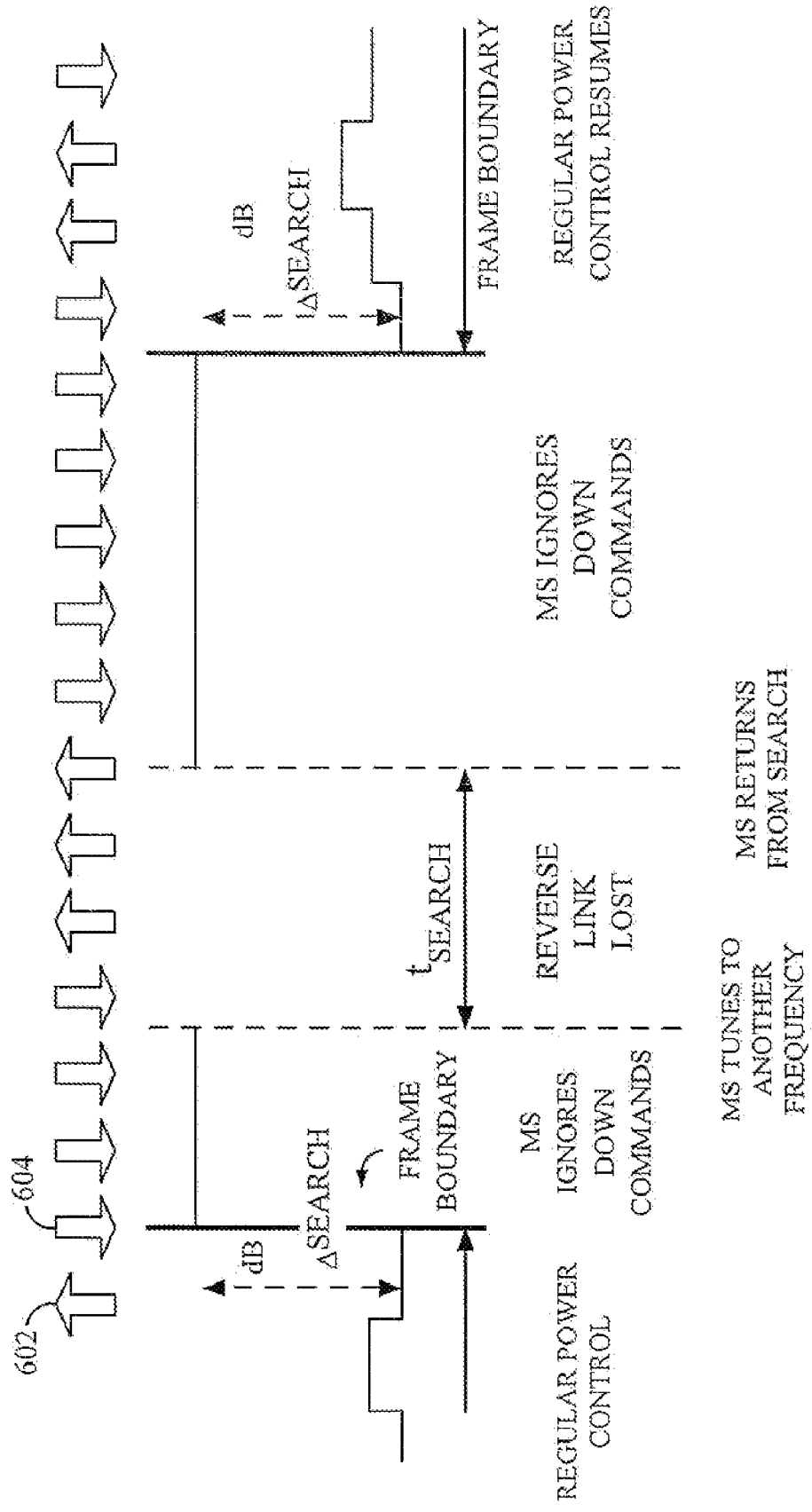
FIG. 6 is a graph of power versus time that illustrates a reverse link power increase during search excursion.

FIG. 6 illustrates the succession of reverse link power increases during a search excursion. While FIG. 6 would be self-explanatory to one of ordinary skill in the relevant art, a brief explanation is provided. During the inter-frequency or inter-system search frame, transmitted with a power increase, the base station 106a will send down commands ordering the mobile station 102 to reduce its power. The mobile station 102 simply ignores those down commands until the end of inter-frequency or inter-system search frame, as shown in FIG. 6. These up and down commands are represented by the large dark arrows 602, 604, respectively, in FIG. 6. If the search excursion expands over a frame boundary, the mobile station 102 can increase its total transmit power during the next frame in a fashion similar to that noted above to overcome the loss of the initial symbols of the next frame. Regular power control resumes after the frame boundary, as shown in FIG. 6.

Figure 7:
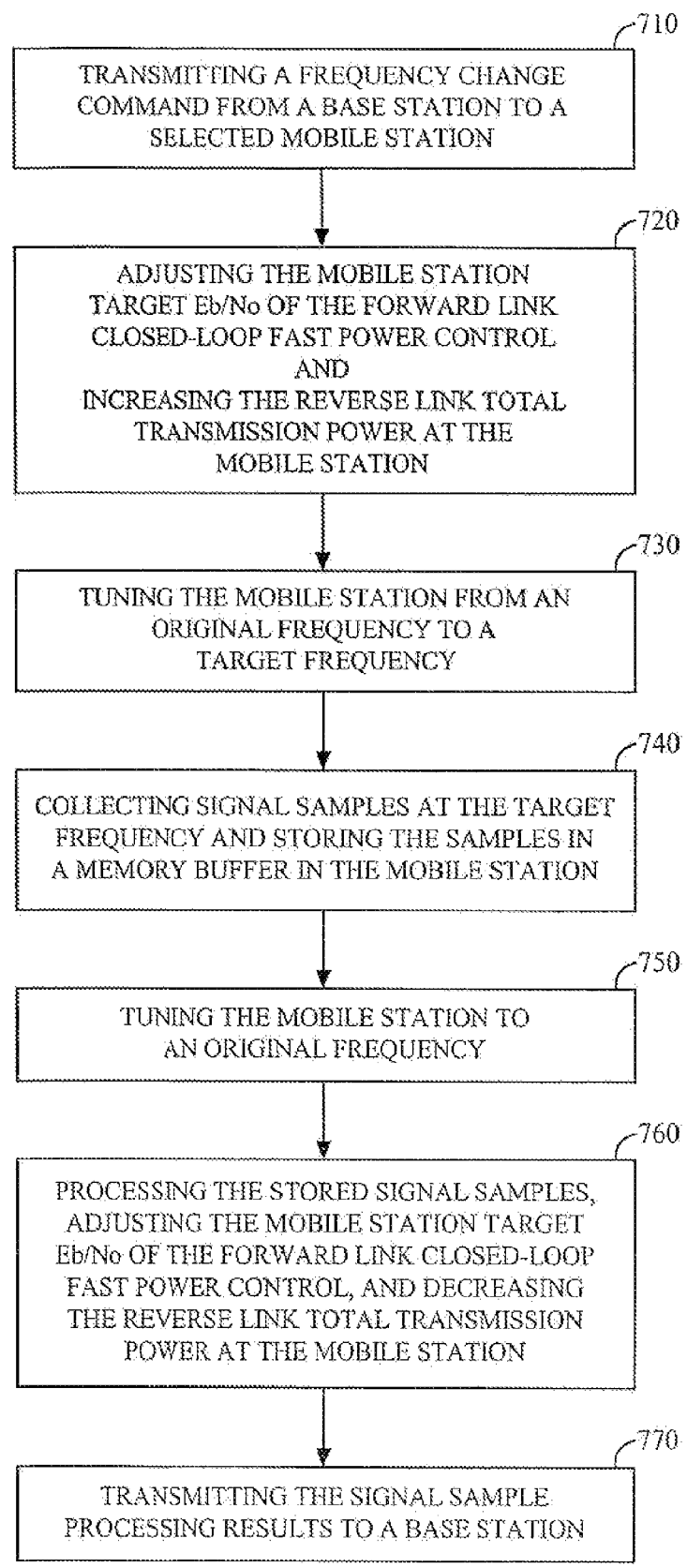
FIG. 7 is a flowchart of a method for performing a frequency search excursion while minimizing disruption of service in accordance with another embodiment of the invention

Thus, the method described previously with respect to FIG. 4 can be modified to ensure uninterrupted communication during a search excursion. FIG. 7 shows the steps of the modified method, beginning with step 710, where the base station 106a transmits the frequency change command (FCSM) to the mobile station 102.

Before the mobile station 102 tunes to the target frequency, the target $E_b/N_o$ of the forward link closed-loop fast power control is increased from a first level to a second level as described above. The mobile station 102 increases the total transmission power on the reverse link by a quantity .DELTA..sub.search dB, as also described above and illustrated in step 720.

The mobile station then tunes to the target frequency and collects target frequency signal samples, such as chip sample data, and stores the signal samples in the memory 207, under steps 730-740.

In step 750, the mobile station 102 tunes back to the first frequency when the collection of signal samples is complete. The mobile station 102 processes the signal samples in the memory buffer and resumes communication with the base station 106a at the first frequency f1. In resuming communications, the mobile station 102 adjusts the target $E_b/N_o$ of the remaining power control groups in the frame, and then reduces the target $E_b/N_o$ by .DELTA..sub.target and the reverse link total transmission power resumes regular control, as illustrated in step 760.

Finally under 780, the signal sample processing results, such as at the pilot strength measurements, are transmitted to the base station.

Offline Search Method with Multi-Channel Reverse Link

A problem that may be encountered in application of the foregoing is a result of the closed loop power control. During the period in which the mobile station increases its transmission energy to compensate for the period of time in which it is offline, the receiving base station will detect the energy of the received signal to be too high. In response, the base station will transmit a series of down commands to the mobile station that may cause the energy of the reverse link transmission boost to be curtailed too early to fully compensate for the time period in which the mobile station is performing offline searching.

In one embodiment, mobile station 850 transmits a plurality of channels including a pilot channel and at least one information channel. In the exemplary embodiment, base station 106 determines the adequacy of the transmission energy of the reverse link signal in accordance with the received energy of the reverse link pilot signal. The reason that the pilot channel energy is used to determine the closed loop power control commands is that the pilot channel energy is not rate dependent. Thus, in this embodiment, the pilot channel transmission power is retained at the level it was prior to the frequency search excursion, while increasing the transmission energy of at least one otter channel transmitted by the mobile station.

Figure 8:
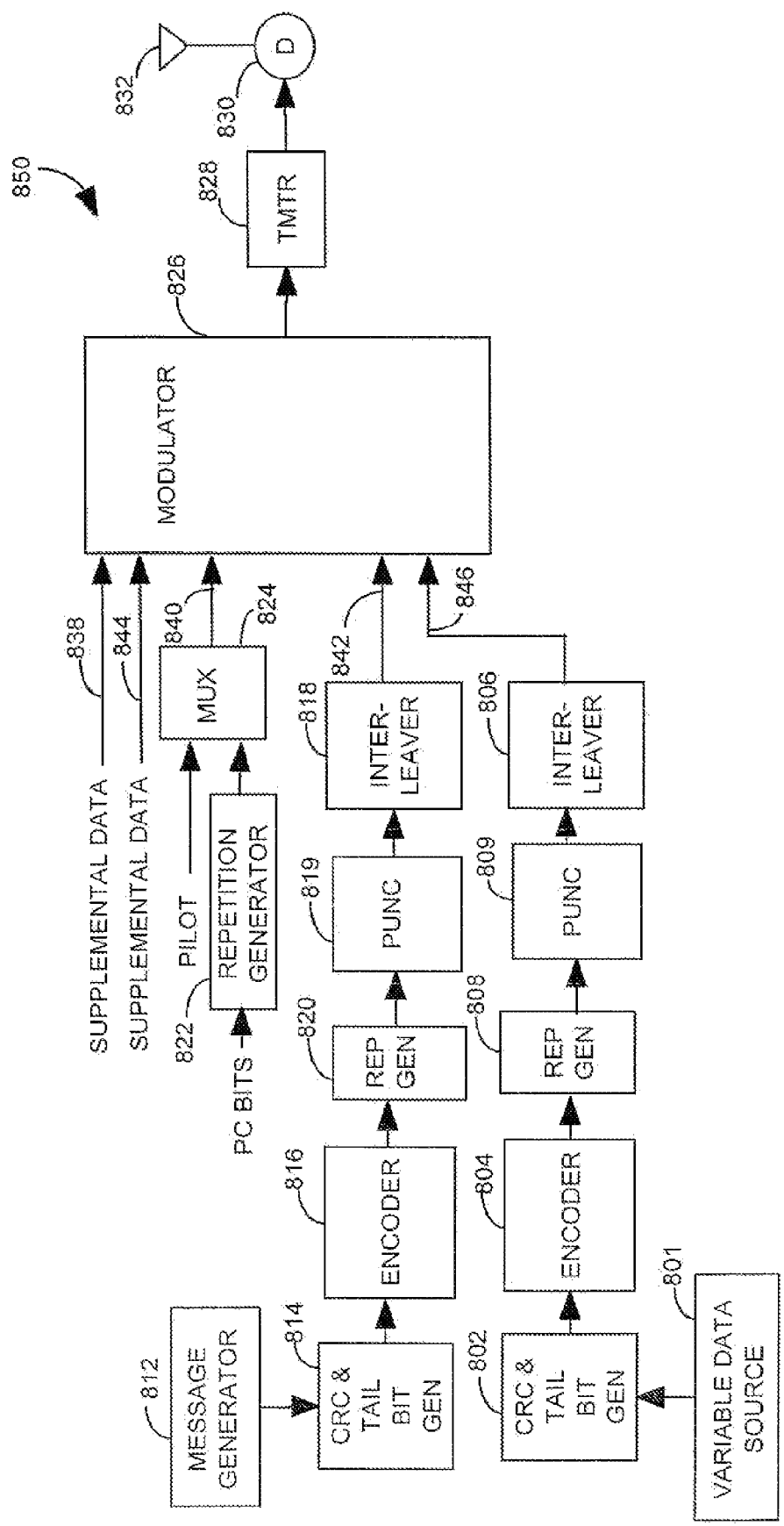
FIG. 8 is a diagram illustrating the multi-channel remote station of the present invention.

FIG. 8 illustrates a functional block diagram of an exemplary embodiment of mobile station 850. It will also be understood that various of the functional blocks shown in FIG. 1 may not be present in other embodiments of the present invention. The functional block diagram of FIG. 8 corresponds to an embodiment that is useful for operation according to the TIA/EIA Standard IS-95C, also referred to as IS-2000. Other embodiments of the present invention are useful for other standards including Wideband and CDMA (WCDMA) standards as proposed by the standards bodies ETSI and ARIB. It will be understood by one skilled in the art that owing to the extensive similarity between the reverse link modulation in the WCDMA standards and the reverse link modulation in the IS-95C standard, extension of the present invention to the WCDMA standards is easily accomplished.

In FIG. 8, the wireless communication device transmits a plurality of distinct channels of information which are distinguished from one another by short orthogonal spreading sequences as described in the aforementioned U.S. patent application Ser. No. 08/886,604. Five separate code channels are transmitted by the wireless communication device: 1) a first supplemental data channel 838, 2) a time multiplexed channel of pilot and power control symbols 840, 3) a dedicated control channel 842, 4) a second supplemental data channel 844 and 5) a fundamental channel 846. The first supplemental data channel 838 and second supplemental data channel 844 carry digital data which exceeds the capacity of the fundamental channel 846 such as facsimile, multimedia applications, video, electronic mail messages or other forms of digital data. The multiplexed channel of pilot and power control symbols 840 carries pilots symbols to allow for coherent demodulation of the data channels by the base station and power control bits to control the energy of transmissions of the base station or base stations in communication with mobile station 850. Control channel 842 carries control information to the base station such as modes of operation of wireless communication device 850, capabilities of mobile station 850 and other necessary signaling information. Fundamental channel 846 is the channel used to carry primary information from the mobile station to the base station. In the case of speech transmissions the fundamental channel 846 carries the speech data.

Supplemental data channels 838 and 844 are encoded and processed for transmission by means not shown and provided to modulator 826. Power control bits are provided to repetition generator 822, which provides repetition of the power control bits before providing the bits to multiplexer (MUX) 824. In multiplexer 824, the redundant power control bits are time multiplexed with pilot symbols and provided on line 840 to modulator 826.

Message generator 812 generates necessary control information messages and provides the control message to CRC and tail bit generator 814. CRC and tail bit generator 84 appends a set of cyclic redundancy check bits which are parity bits used to check the accuracy of the decoding at the base station and appends a predetermined set of tail bits to the control message to clear the memory of the decoder at the base station receiver subsystem. The message is then provided to encoder 816, which provides forward error correction coding upon the control message. The encoded symbols are provided to repetition generator 820 which repeats the encoded symbols to provide additional time diversity in the transmission. Following repetition generator certain symbols are punctured according to some predetermined puncturing pattern by puncturing element (PUNC) 819 to provide a predetermined number of symbols within the frame. The symbols are then provided to interleaver 818 which reorders the symbols in accordance with a predetermined interleaving format. The interleaved symbols are provided on line 842 to modulator 826.

Variable rate data source 801 generates variable rate data. In the exemplary embodiment, variable rate data source 801 is a variable rate speech encoder such as described in aforementioned U.S. Pat. No. 5,414,796. Variable rate speech encoders are popular in wireless communications because their use increases the battery life of wireless communication devices and increases system capacity with minimal impact on perceived speech quality. The Telecommunications Industry Association has codified the most popular variable rate speech encoders in such standards as Interim Standard IS-96 and Interim Standard IS-733. These variable rate speech encoders encode the speech signal at four possible rates referred to as full rate, half rate, quarter rate or eighth rate according to the level of voice activity. The rate indicates the number of bits used to encode a frame of speech and varies on a frame by frame basis. Full rate uses a predetermined maximum number of bits to encode the frame, half rate uses half the predetermined maximum number of bits to encode the frame, quarter rate uses one quarter the predetermined maximum number of bits to encode the frame and eighth rate uses one eighth the predetermined maximum number of bits to encode the frame.

Variable rate, date source 801 provides the encoded speech frame to CRC and tail bit generator 802. CRC and tail bit generator 802 appends a set of cyclic redundancy check bits which are parity bits used to check the accuracy of the decoding at the base station and appends a predetermined set of tail bits to the control message in order to clear the memory of the decoder at the base station. The frame is then provided to encoder 804, which provides forward error correction coding on the speech frame. The encoded symbols are provided to repetition generator 808 which provides repetition of the encoded symbol. Following repetition generator certain symbols are punctured by puncturing element 809 according to a predetermined puncturing pattern to provide a predetermined number of symbols within the frame. The symbols are then provided to interleaver 806 which reorders the symbols in accordance with a predetermined interleaving format. The interleaved symbols are provided on line 846 to modulator 826.

In the exemplary embodiment, modulator 826 modulates the data channels in accordance with a code division multiple access modulation format and provides the modulated information to transmitter (TMTR) 828, which amplifies and filters the signal and provides the signal through duplexer 830 for transmission through antenna 832.

In IS-95 and cdma2000 systems, a 20 ms frame is divided into sixteen sets of equal numbers of symbols referred to as power control groups. The reference to power control is based on the fact that for each power control group, the base station receiving the frame issues a power control command in response to a determination of then sufficiency of the received reverse link signal at the base station.

Figure 9:
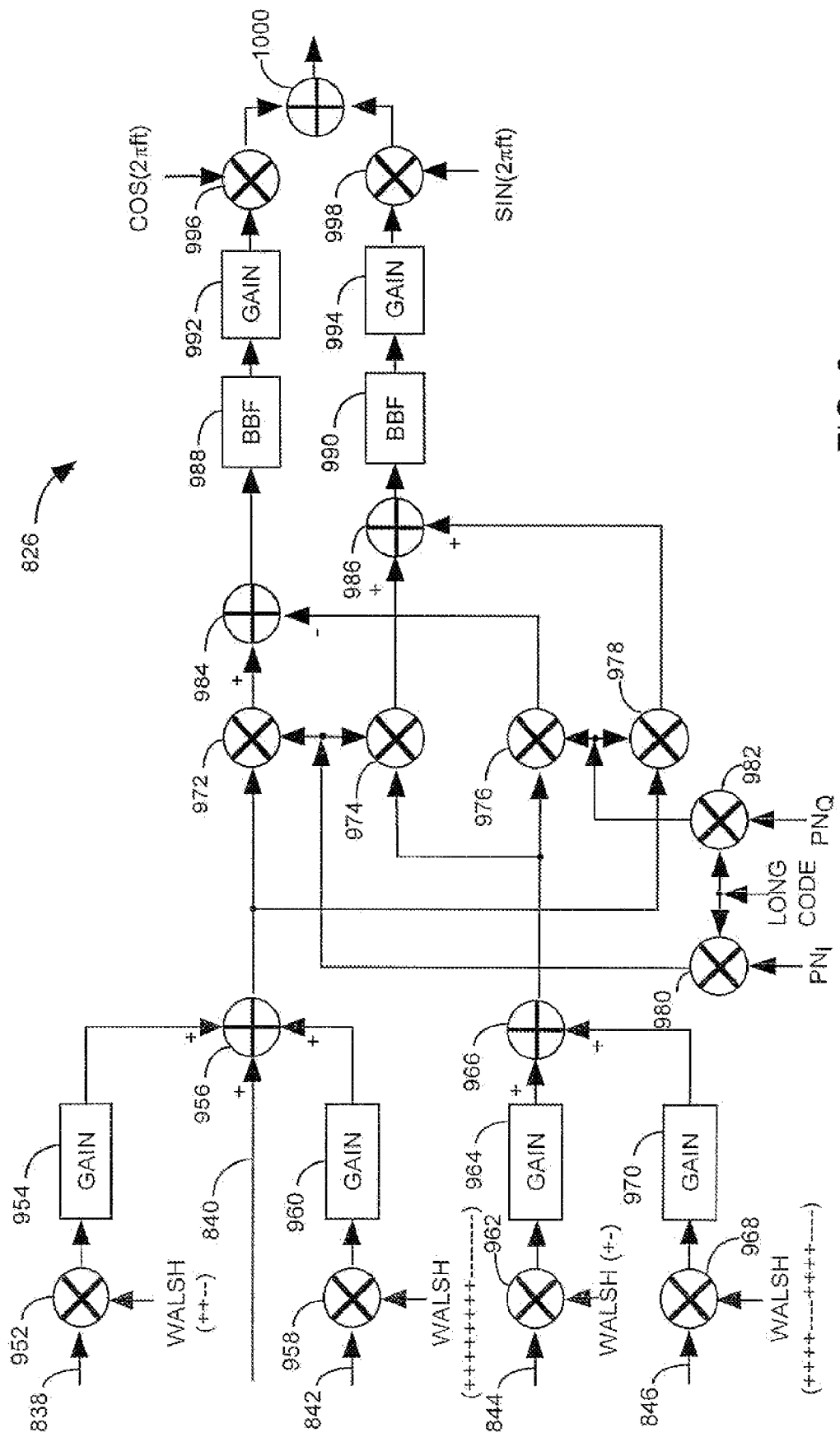
FIG. 9 is a diagram illustrating the reverse link modulator of the present invention.

FIG. 9 illustrates a functional block diagram of an exemplary embodiment of modulator 826 of FIG. 8. The first supplemental data channel data is provided on line 838 to spreading element 952, which covers the supplemental channel data in accordance with a predetermined spreading sequence. In the exemplary embodiment, spreading element 952 spreads the supplemental channel data with a short Walsh sequence (++--). The spread data is provided to relative gain element 954, which adjusts the gain of the spread supplemental channel data relative to the energy of the pilot and power control symbols. The gain adjusted supplemental channel data is provided to a first summing input of summer 956. The pilot and power control multiplexed symbols are provided on line 840 to a second summing input of summing element 956.

Control channel data is provided on line 842 to spreading element 958 which covers the supplemental channel data in accordance with a predetermined spreading sequence. In the exemplary embodiment, spreading element 958 spreads the supplemental channel data with a short Walsh sequence (++++++++--------). The spread data is provided to relative gain element 960, which adjusts the gain of the spread control channel data relative to the energy of the pilot and power control symbols. The gain adjusted control data is provided to a third summing input of summer 956.

Summing element 956 sums the gain adjusted control data symbols, the gain adjusted supplemental channel symbols and the time multiplexed pilot and power control symbols and provides the sum to a first input of multiplier 972 and a first input of multiplier 978.

The second supplemental channel is provided on line 844 to spreading element 962, which covers the supplemental channel data in accordance with a predetermined spreading sequence. In the exemplary embodiment spreading element 962 spreads the supplemental channel data with a short Walsh sequence (++). The spread data is provided to relative gain element 964, which adjusts the gain of the spread supplemental channel data. The gain adjusted supplemental channel data is provided to a first summing input of summer 966.

The fundamental channel data is provided on line 846 to spreading element 968 which covers the fundamental channel data in accordance with a predetermined spreading sequence. In the exemplary embodiment spreading element 968 spreads the fundamental channel data with a short Walsh sequence (++++----++++----). The spread data is provided to relative gain element 970, which adjusts the gain of the spread fundamental channel data. The gain adjusted fundamental channel data is provided to a second summing input of summer 966.

Summing element 966 sums the gain adjusted second supplemental channel data symbols and the fundamental channel data symbols and provides the sum to a first input of multiplier 974 and a first input of multiplier 976.

In the exemplary embodiment, a pseudonoise spreading using two different short PN sequences ($PN_1$, and $PN_Q$) is used to spread the data. In the exemplary embodiments the short PN sequences, $PN_1$ and $PN_Q$, are multiplied by a long PN code to provide additional privacy. The generation of pseudonoise sequences is well known in the art and is described in detail in aforementioned U.S. Pat. No. 5,103,459. A long PN sequence is provided to a first input of multipliers 980 and 982. The short PN sequences, $PN_1$ is provided to a second input of multiplier 980 and the short PN sequence $PN_Q$ is provided to a second input of multiplier 982.

The resulting PN sequence from multiplier 980 is provided to respective second inputs of multipliers 972 and 974. The resulting PN sequence from multiplier 982 is provided to respective second inputs of multipliers 976 and 978. The product sequence from multiplier 972 is provided to the summing input of subtractor 984. The product sequence from multiplier 974 is provided to a first summing input of summer 986. The product sequence from multiplier 976 is provided to the subtracting input of subtractor 984. The product sequence from multiplier 978 is provided to a second summing input of summer 986.

The difference sequence from subtractor 984 is provided to baseband filter 988. Baseband filter 988 performs necessary filtering on the difference sequence and provides the filtered sequence to gain element 992. Gain element 992 adjusts the gain of the signal and provides the gain adjusted signal to upconverter 996. Upconverter 996 upconverts the gain adjusted signal in accordance with a QPSK modulation format and provides the unconverted signal to a first input of summer 1000.

The sum sequence from summer 986 is provided to baseband filter 990. Baseband filter 990 performs necessary filtering on difference sequence and provides the filtered sequence to gain element 994. Gain element 994 adjusts the gain of the signal and provides the gain adjusted signal to upconverter 998. Upconverter 998 upconverts the gain adjusted signal in accordance with a QPSK modulation format and provides the upconverted signal to a second input of summer 1000. Summer 1000 sums the two QPSK modulated signals and provides the result to transmitter 828.

As described above, when mobile station 850 tunes to another frequency f2 to perform an inter-frequency or inter-system search, forward link symbols transmitted by the base station during the t.sub.search time period cannot be received by the mobile station. Similarly mobile station 850 does not transmit during t.sub.search and the base station loses reverse link symbols during the t.sub.search time period.

While searching on the target frequency f2, the base station 106*a* will lose communication with the mobile station 850 and will not receive symbols during the t.sub.search time period. To overcome the loss of those symbols, mobile station 850 increases the transmission power of the information channels, including the first supplemental channel 838, second supplemental channel 844, control channel 842 and fundamental channel 846, while keeping the transmission power of the multiplexed power control command and pilot symbol channel 840 at levels previous to the offline search.

The quantity .DELTA..sub.search depends on the duration of the search t.sub.search and corresponds to the additional required, symbol energy over the remainder of the frame to overcome the loss of symbols during t.sub.search and still permit the base station 106*a* to demodulate the frame correctly. The base station 106*a* can inform the mobile station 850 of the maximum tolerable increase .DELTA..sub.search dB in the message directing the mobile, station to perform an search (e.g., in the ("FCSM")). This value can depend on the maximum tolerable interference currently determined by the base station 106*a*.

Upon returning from the offline search algorithm, gain elements 954, 960, 964 and 970 are provided with control signals increasing the gains of those channels by .DELTA..sub.search dB. However, the transmission energy of the pilot channel is not effected. Because the reverse link power control commands are generated in accordance with the received energy of the reverse link pilot signal, the closed loop power control commands will not be responsive to the increase .DELTA..sub.search dB provided to compensate for the offline search.

In one embodiment, mobile station 850 is able to respond to the condition in which although it cannot increase the transmission power of all of its transmitted information channels by .DELTA..sub.search dB. Mobile station, 850 may not be able to increase the transmission energy of the information channels because of limits on its power supply. Mobile station 850 ranks the channels it is transmitting in accordance with the importance that its reverse link transmission not be interrupted. Factors that may figure into the ranking may include the kind of data being transmitted, the availability of retransmission protocols, the type of forward error correction being provided, etc. Mobile station 850 then increases the transmission power of these channels in accordance with this ranking.

The base station 106*a* and the mobile stations 102 and 850 can be configured to accomplish the foregoing process. Source code to accomplish the foregoing can be readily generated by those of ordinary skill in this technology based on the detailed description provided herein.

While an embodiment of the invention has been illustrated and described above, it is to be understood that various changes may be made therein without departing from the spirit and scope of the invention. For example, the mobile stations 102 and 850 can use the state of its long code mask to select a staring position within a frame to perform the inter-frequency or inter-system search. The mobile stations 102 and 850 can select a randomization period such that the inter-frequency or intern system search would typically not expand over a frame. Randomizing the search excursion position between different mobile stations will reduce the reverse link interference and will decrease the total power requirement on the forward link.

Search Excursion Timing

In addition to the actual implementation of search excursions, the timing of the search excursion implementation can play an important role in maintaining a low FER. The embodiments described above are optimal for signal frames that carry a multiplicity of symbols carrying redundant copies of data. Hence, even though some symbols on the original frequency are not detected during the search excursion to a target frequency the decoder can still determine the data carried by the frame by decoding the symbols that the decoder does receive. In the CDMA systems discussed above, the demodulation components within the mobile stations and base stations perform a blind rate detection in which data is decoded without the need for transmission information sent by the transmitter. However, in the preferred implementation of a wideband code division multiple access (WCDMA) system, transmission information is included within the signal frame to enable demodulation and decoding functions at the receiver. If the symbols carrying the transmission information are not received, the receiver will have difficulties decoding the signal frame.

Previous proposals for performing inter-frequency or inter-system handoffs in a WCDMA system involved either the use of dual receivers, or the use of a slotted mode, approach. In the slotted mode approach, the information transmitted within a "radio frame" is compressed so that a portion of the slot is left unused. During this unused portion of the slot, a search excursion can be performed without loss of data.

The present embodiments bypass the expense of dual receivers and bypass the complexities inherent in performing data compression and data extraction from compressed data. The present embodiments exploit the internal structure of the physical channel in order to time search excursion positions during slots that are used to carry data.

A WCDMA system, such as one described in 3.sup.rd Generation Partnership Project "3GPP", Document Nos. 3GPP TS 25.211v4.1.0, 3GPP TS 25.212v4.1.0, 3GPP TS 25.213v4.1.0, and 3GPP TS 25.214v4.1.0, generates channels that comprise Transmission Time Intervals (TTIs), which can be 10, 20, 40 or 80 milliseconds ill duration. The basic building block of a TTI is a 10 ms radio flame that is composed of 15 slot periods.

The transmission path from a base station to a mobile unit is referred to as the downlink in a WCDMA system and as the forward link in an IS-95 system. The transmission path from a mobile unit to a base station is referred to as the uplink in a WCDMA system and as the reverse link in an IS-95 system.

A WCDMA base station transmits common downlink physical channels (e.g. Common Pilot Channel or CPICH, Primary Common Control Physical Channel or P-CCPCH, Secondary Common Control Physical Channel or S-CCPCH) and dedicated downlink physical channels, which are also known as downlink DPCH. The data sent on the common or dedicated physical channels are convolutionally encoded (or encoded with turbo codes), undergo symbol repetition, and are interleaved.

The WCDMA base station receives common uplink physical channels (e.g. Physical Random Access Channel or PRACH) and dedicated uplink physical channels, which are also known as uplink DPCH. Data sent on common or dedicated physical channels is also convolutionally encoded (or encoded with turbo codes), repeated, and interleaved. An uplink dedicated physical channel is composed of a dedicated physical data channel (DPDCH) and a dedicated physical control channel (DPCCH) that are spread with in-phase and quadrature phase spreading sequences, which are then multiplexed together. In WCDMA, the traffic channel is sometimes referred to as a dedicated physical data channel (DP-DCH).

On the uplink, the DPDCH and DPCCH are the in-phase and quadrature phase components of a multiplexed TTI. While the basic building block is a 10 ms radio frame with 15 slots, it is possible to construct TTIs of 10, 20, 40 or 80 milliseconds in duration. The transmitter can indicate in each 10 ms frame which transmission time interval (TTI) is being used in the transmission. This indication informs the receiving party of the length of a block of interleaved hits.

Figure 10:
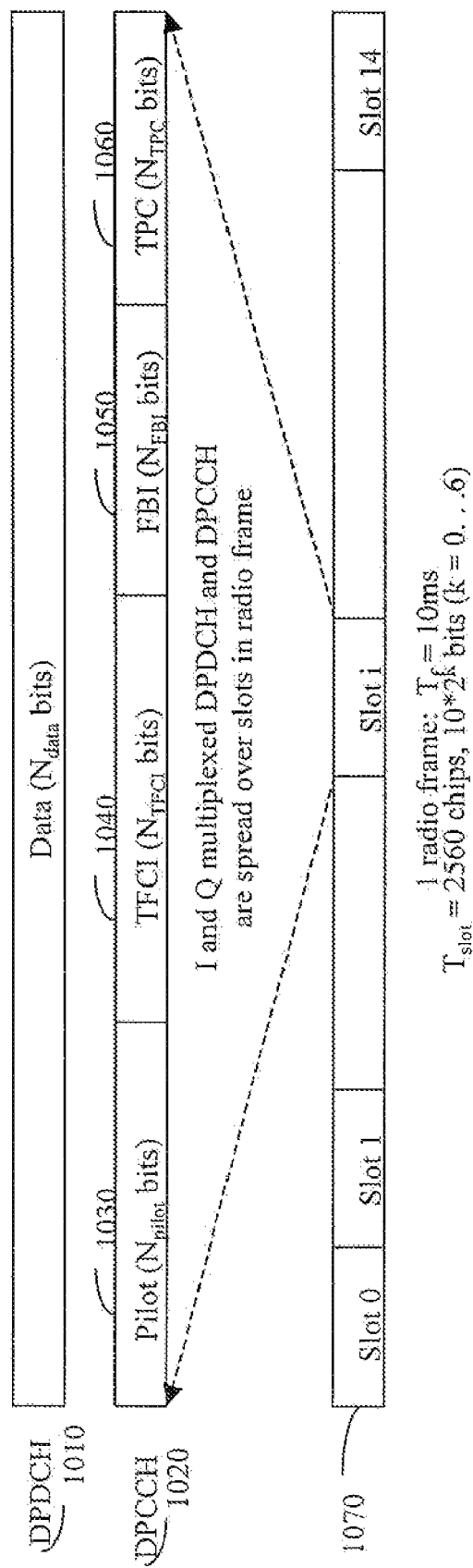
FIG. 10 is a block diagram of an uplink radio frame structure used in a WCDMA system.

FIG. 10 illustrates the frame structure for a 10 ms uplink frame. Each uplink radio frame carries DPDCH data bits 1010 and DPCCH bits 1020 that have been multiplexed together. A pilot 1030, a Transport Format Combination Indicator (TFCI) 1040, a Feedback Indicator (FBI) 1050, and a group of Terminal Power Control (TPC) bits 1060 comprise the DPCCH. The multiplexed DPDCH and DPCCH are spread over the slots of a radio frame 1070. Hence, an 80 ms TTI built from 10 ms radio frames would have 8 groups of pilot bits, 8 groups of TFCI bits, 8 groups of FBI bits, and 8 groups of TPC bits.

Figure 11:
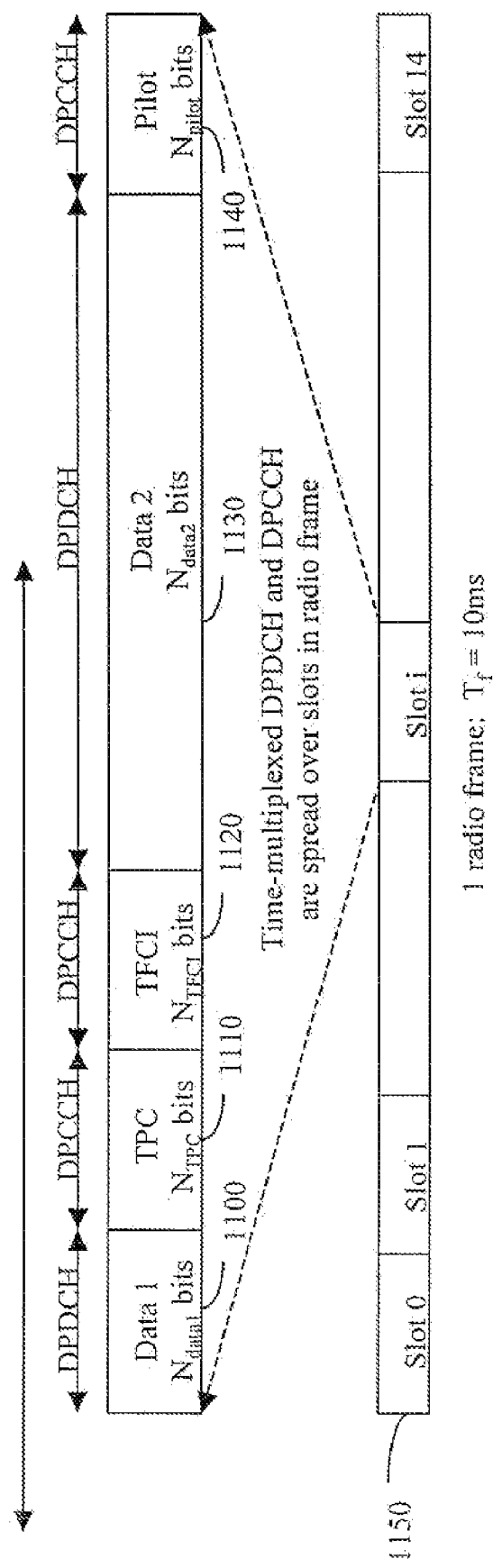
FIG. 11 is a block diagram of a downlink radio frame structure used in a WCDMA system.

In the downlink, the DPDCH and the DPCCH are time multiplexed into a frame. FIG. 11 illustrates the frame structure for a downlink frame. The DPDCH and the DPCCH are time-multiplexed into a first data portion 1100, a TPC portion 1110, a TFCI portion 1120, a second data portion 1130, and a pilot portion 1140. These portions are encoded, repeated, and interleaved, so that they can be spread over the slots of a radio frame 1150. Hence, in an 80 ms TTI composed of 10 ms radio frames there are 8 groups of first data bits, 8 groups of TPC bits, 8 groups of TFCI bits, 8 groups of second data bits, and 8 groups of pilot bits.

The TFCI is used to inform a receiver of specific characteristics of received transmissions, the knowledge of which is used for the accurate decoding of the transmission. If the TFCI is not included, the receiver must perform a bind rate detection and the embodiments for search excursions that are not timed can be used. A description of blind rate detection in a system such as WCDMA is presented in co-pending U.S. patent application Ser. No. 09/655,609, filed on Sep. 6, 2000, entitled, "METHOD AND APPARATUS FOR PROCESSING A PHYSICAL CHANNEL WITH PARTIAL TRANS- PORT FORMAT INFORMATION," and assigned to the assignee of the present invention.

In typical implementations, the TFCI bits are indexes that correlate to a specific combination of transmission properties in a set of combinations. This set of all combinations (referred to as the Transport Format Combination Set) is decided by the base station and is sent by upper layer signaling to the mobile station when required, i.e. for reception of downlink physical channels in the mobile station. Transmission properties include, but are not limited to, the type of encoding scheme used by the transmitter, the type of puncturing scheme, the type of repetition scheme, and the length of the block interleaver used upon the data portion of the radio frame. Hence, if a receiving party cannot determine the value of the TFCI bits, the receiving party may lose the information carried by the data portion of the radio frame.

In embodiments that are implemented in a WCDMA system, the structure of the time-multiplexed physical channel is exploited in order to time search excursions. In one embodiment, transmission power is increased either before or after the search excursions (or both before and after), as previously described in the embodiments above, but the timing of the search excursion is set so that no search excursion can be performed in the first portion of a TTI, i.e., during the first radio frame of the plurality of radio frames that form the TTI. Since the basic building blocks of a TTI are 10 ms radio frames, no search excursion should be performed in the first 10 ms of a TTI. It similarly follows that no search excursion should be perforated during a TTI composed of only a single 10 ms radio frame.

If a search excursion is performed at the beginning of the TTI, then it is likely that the mobile unit will return from the target frequency to the original frequency and be unable to decode the received symbols of a subsequent radio frame since the TFCI bits where lost during the search excursion. In practice, the lack of the information due to the lack of TFCI bits forces the receiving party to make a random guess as to the format of the data portion of the radio frame. Due to the multiplicity of format choices, such a random guess would likely be incorrect, which would result in the use of the wrong format for buffering the first set of data symbols. If the incorrectly buffered data is combined with the remaining, correctly buffered data symbols, then a decoding error or block error would ensue.

If a search excursion is performed elsewhere in the TTI, then the loss of a TFCI value is not likely to result in the loss of transmission data if the TFCI value from a previous radio frame is used in place of a lost TFCI value. In a TTI of length larger than 10 ms, there is a high probability that the same TFCI value will be transmitted in all blocks of the TTI.

Figure 12:
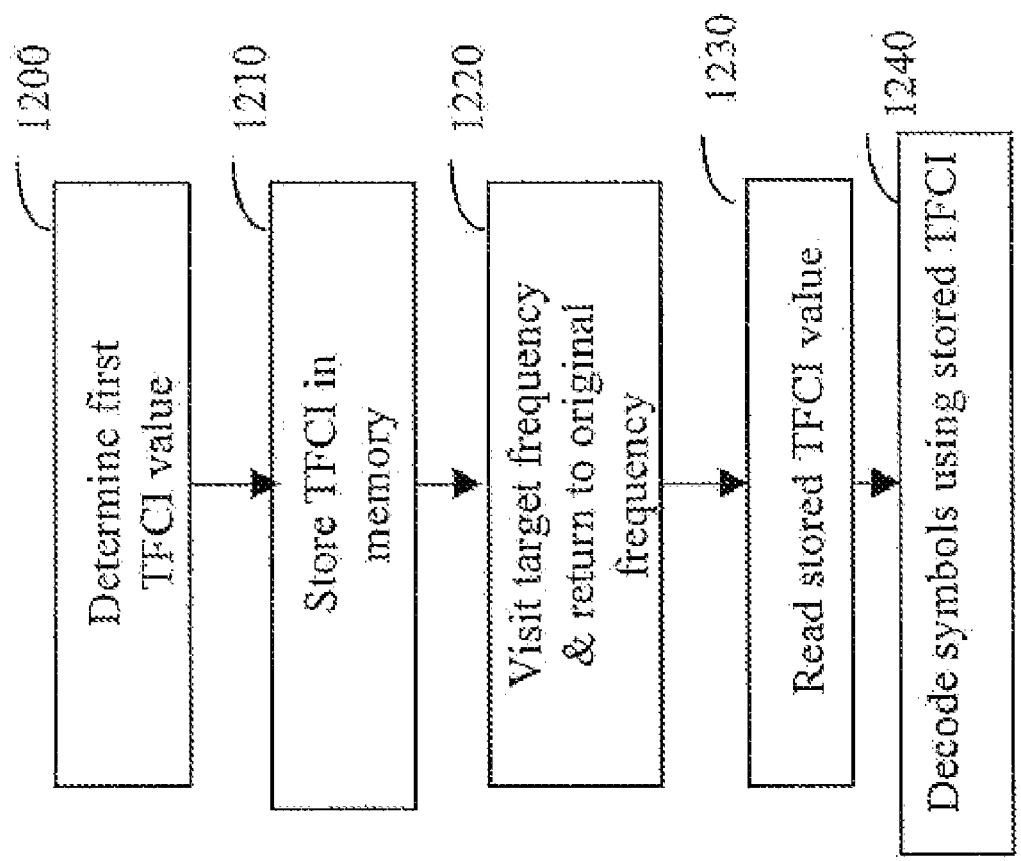
FIG. 12 is a flowchart of a method for timing a search excursion in a WCDMA system.

FIG. 12 is flow chart of a method for timing the search excursion, wherein no search excursion is performed during the first block or radio frame of an uplink or downlink TTI. The method can be implemented by a component subsystem within a mobile station, comprising a processor element and a memory workings with the search excursion elements described previously. Alternatively, the method can be implemented as a software enhancement to already existing processors and memory elements.

At step 1200, a mobile unit will detect and decode the first TFCI of the TTI. At step 1210, the mobile unit stores the TFCI value in a memory element. At step 1220, the mobile unit performs a search excursion to a target frequency and returns to the original frequency before the end of the TTI. At step 1230, the mobile unit reads the TFCI value from memory and at step 1240, the mobile unit uses the stored TFCI value to decode the subsequently received portion of the TTI. The program flow can be implemented within the mobile unit by a processor element that is configured to control a receiver subsystems which can demodulate and decode symbols on separate frequencies. The processor element is further configured to command a decoder within the receiver subsystem to use the stored TFCI value to decode the subsequently received portion of the TTI.

The basic method described by FIG. 12 cal be improved by combining the method with the power control techniques described previously. For example, at step 1200, when the mobile unit detects the first TFCI, the mobile unit can increase the target $E_b/N_o$ of the downlink before the search excursion occurs. Alternatively, the mobile station can increase the target $E_b/N_o$ of the downlink after the search excursion occurs.

For illustrative ease, the embodiments herein have been described in relation to standardized configurations for WCDMA. However, variations of the embodiments can be implemented for configurations that are not currently specified. For example, in the instance wherein radio frames are not designated as being 10 milliseconds in duration, it is possible to construct TTIs that are not 10, 20, 40 or 80 milliseconds in duration. However, the method for timing a search excursion remains the same, in that the processor must still detect and decode the first TFCI of the TTI.

Thus, novel and improved methods and apparatus for performing inter-frequency or inter-system hand-offs have been described. Those of skill in the art would understand that the various illustrative logical blocks, modules, circuits, and algorithm steps described in connection with the embodiments disclosed herein may be implemented as electronic hardware, software, firmware, or combinations thereof. The various illustrative components, blocks, modules, circuits, and steps have been described generally in terms of their functionality. Whether the functionality is implemented as hardware, software, or firmware depends upon the particular application and design constraints imposed on the overall system. Skilled artisans recognize the interchangeability of hardware, software, and firmware under these circumstances, and how best to implement the described functionality for each particular application.

Implementation of various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components. A processor executing a set of firmware instructions, any conventional programmable software module and a processor, or any combination thereof can be designed to perform the functions of the control element described herein. The processor may be a microprocessor, but in the alternative, the processor may be any conventional processor, controller, microcontroller, or state machine. The software module could reside in RAM memory, flash memory, ROM memory, EPROM memory, EEPROM memory, registers, bard disk, a removable disk, a CD-ROM, or any other form of storage medium known in the art. An exemplary processor is coupled to the storage medium so as to read information from, and write information to, the storage medium. In the alternative, the storage medium may reside in an ASIC. The ASIC may reside in a telephone or other user terminal. In the alternative, the process or and the storage medium may reside in a telephone or other user terminal. The processor may be implemented as a combination of a DSP and a microprocessor, or as to microprocessors in conjunction with a DSP core, etc.

Those of skill would further appreciate that the data, instructions, commands, information, signals, bits, symbols, and chips that may be referenced throughout the above description are represented by voltages, currents, electromagnetic waves, magnetic fields or particles, optical fields or particles, or any combination thereof.

Various embodiments of the present invention have thus been shown and described. It would be apparent to one of ordinary skill in the art, however, that numerous alterations may be made to the embodiments herein disclosed without departing from the spirit or scope of the invention.

The invention claimed is:

1. A method for performing a search excursion from an original frequency signal on a wireless communication system to a target frequency signal, comprising:
    decoding at least one radio frame in a Transmission Time Interval (TTI) on the original frequency signal;
    extracting a parameter value from the at least one radio frame and storing the parameter value in a memory element;
    tuning to the target frequency signal after storing the parameter value;
    tuning to the original frequency signal; and
    decoding a subsequently received radio frame in the TTI by using the stored parameter value.

2. The method of claim 1, wherein the target frequency is on a WCDMA system.

3. The method of claim 1, wherein the target frequency is on a non-WCDMA system.

4. A method for timing a search excursion performed by a mobile station operating in a spread spectrum communications system, comprising:
    detecting a first radio frame of a Transmission Time Interval (TTI) on an original frequency;
    extracting a plurality of indicator bits from the first radio frame;
    storing the plurality of indicator bits;
    performing the search excursion on a target frequency, wherein the search excursion ends with a return to the original frequency; and
    decoding a subsequent radio frame of the TTI using the stored plurality of indicator bits from the first radio frame.

5. The method of claim 4, wherein the first radio frame is 10 ms in duration.

6. The method of claim 5, wherein performing the search excursion on the target frequency comprises tuning the mobile station to the target frequency, whereupon the mobile station collects and stores signal samples from the target frequency.

7. The method of claim 6, wherein the method for timing the search excursion further comprises increasing the amount of power allocated to the subsequent radio frame of the TTI.

8. The method of claim 6, wherein the method for timing the search excursion further comprises increasing the amount of power allocated to the first radio frame of the TTI.

9. An apparatus for performing a timed search excursion in a wireless communication system, comprising:
    at least one memory element; and
    a processor configured to execute a set of instructions stored on the at least one memory element, the set of instructions for:
        decoding at least one radio frame in a Transmission Time Interval (TTI) on the original frequency;
        extracting a parameter value from the at least one radio frame and storing the parameter value in the at least one memory element;
        controlling a search excursion to a target frequency after storing the parameter value, wherein the search excursion ends with a return to the original frequency; and
        decoding a subsequently received radio frame by using the stored parameter value.

10. The apparatus of claim 9, wherein the target frequency is on a WCDMA system.

11. The apparatus of claim 9, wherein the target frequency is on a non-WCDMA system.

12. The apparatus of claim 9, wherein the at least one radio frame is 10 ms in duration.

13. The apparatus of claim 12, wherein the intructions for controlling the search excursion to the target frequency comprises instructions for tuning the apparatus to the target frequency, whereupon the apparatus collects and stores signal samples from the target frequency.

14. The apparatus of claim 13, wherein the set of instructions further comprise increasing the amount of power allocated to the subsequent radio frame of the TTI.

15. The apparatus of claim 13, wherein the set of instructions further comprise increasing the amount of power allocated to the first radio frame of the TTI.

16. An apparatus for performing a timed search excursion in a wireless communication system, comprising:
    means for decoding at least one radio frame in a Transmission Time Interval (TTI) on an original frequency;
    means for extracting a parameter value from the at least one radio frame and storing the parameter value in at least one memory element;
    means for performing a frequency search on a target frequency and returning to the original frequency, whereupon the means for decoding the at least one radio frame further decodes a subsequently received radio frame by using the stored parameter value.

17. The apparatus of claim 16, wherein the target frequency is on a WCDMA system.

18. The apparatus of claim 16, wherein the target frequency is on a non-WCDMA system.

19. The apparatus of claim 16, wherein the at least one radio frame is 10 ms in duration.

20. The apparatus of claim 19, wherein the means for performing the frequency search on the target frequency comprises means for tuning the apparatus to the target frequency, whereupon the apparatus collects and stores signal samples from the target frequency.

21. The apparatus of claim 20, further comprising means for increasing the amount of power allocated to the subsequent radio frame of the TTI.

22. The apparatus of claim 20, further comprising means for increasing the amount of power allocated to the first radio frame of the TTI.

23. A method for timing a frequency search excursion in a wireless communications system having a mobile station exchanging communications with a base station, the method comprising:
    determining at least one transmission parameter value from a first radio frame of a plurality of radio frames associated with an original frequency, and storing the at least one transmission parameter value;
    tuning the mobile station to a target frequency, whereupon the mobile station collects and stores signal samples from the target frequency;
    tuning the mobile station to the original frequency;
    processing the stored samples from the target frequency to obtain a result;
    transmitting the result from processing the stored samples to the base station;

increasing the amount of power allocated to subsequently received radio frames of the plurality of associated radio frames; and decoding the subsequently received frame symbols using the stored transmission parameter value.

24. The method of claim 23 further comprising the step of keeping the transmission energy of a pilot channel equal to the transmission energy of the pilot channel prior to said frequency search excursion.

25. The method of claim 23 further comprising the steps of:
determining whether said mobile station is capable of increasing the transmission power of said information channels to the desired extent; and
selectively increasing the transmission power of said information channels when said mobile station is not capable of increasing the transmission power of said information channels to the desired extent.

26. The method of claim 25, wherein selectively increasing the transmission power of said information channels, comprises the steps of:
ranking the channels in accordance with the importance of having a non- interrupted reverse link transmission; and
adjusting the transmission energies of said information channels in accordance with said ranking.

27. The method of claim 26 wherein said information channels comprise a traffic channel and a common access channel.

28. A non-transitory computer-readable medium for performing a search excursion from an original frequency signal on a wireless communication system to a target frequency signal, comprising:
a first set of codes for causing a computer to decode at least one radio frame in a Transmission Time Interval (TTI) on the original frequency signal;
a second set of codes for causing a computer to extract a parameter value from the at least one radio frame and storing the parameter value in a memory element;
a third set of codes for causing a computer to tune to the target frequency signal after storing the parameter value;
a fourth set of codes for causing a computer to tune to the original frequency signal; and
a fifth set of codes for causing a computer to decode a subsequently received radio frame in the TTI by using the stored parameter value.

29. A non-transitory computer-readable medium for timing a frequency search excursion in a wireless communications system having a mobile station exchanging communications with a base station, comprising:

a first set of codes for causing a computer to determine at least one transmission parameter value from a first radio frame of a plurality of radio frames associated with an original frequency, and storing the at least one transmission parameter value;
a second set of codes for causing a computer tune the mobile station to a target frequency, whereupon the mobile station collects and stores signal samples from the target frequency;
a third set of codes for causing a computer to tune the mobile station to the original frequency;
a fourth set of codes for causing a computer to process the stored samples from the target frequency to obtain a result;
a fifth set of codes for causing a computer to transmit the result from processing the stored samples to the base station;
a sixth set of codes for causing a computer to increase the amount of power allocated to subsequently received radio frames of the plurality of associated radio frames; and
a seventh set of codes for causing a computer to decode the subsequently received frame symbols using the stored transmission parameter value.

30. An apparatus for timing a frequency search excursion in a wireless communications system having a mobile station exchanging communications with a base station, the apparatus comprising:
means for determining at least one transmission parameter value from a first radio frame of a plurality of radio frames associated with an original frequency, and storing the at least one transmission parameter value;
means for tuning the mobile station to a target frequency, whereupon the mobile station collects and stores signal samples from the target frequency;
means for tuning the mobile station to the original frequency;
means for processing the stored samples from the target frequency to obtain a result;
means for transmitting the result from processing the stored samples to the base station;
means for increasing the amount of power allocated to subsequently received radio frames of the plurality of associated radio frames; and
means for decoding the subsequently received frame symbols using the stored transmission parameter value.

* * * * *